UNITED STATES PATENT OFFICE

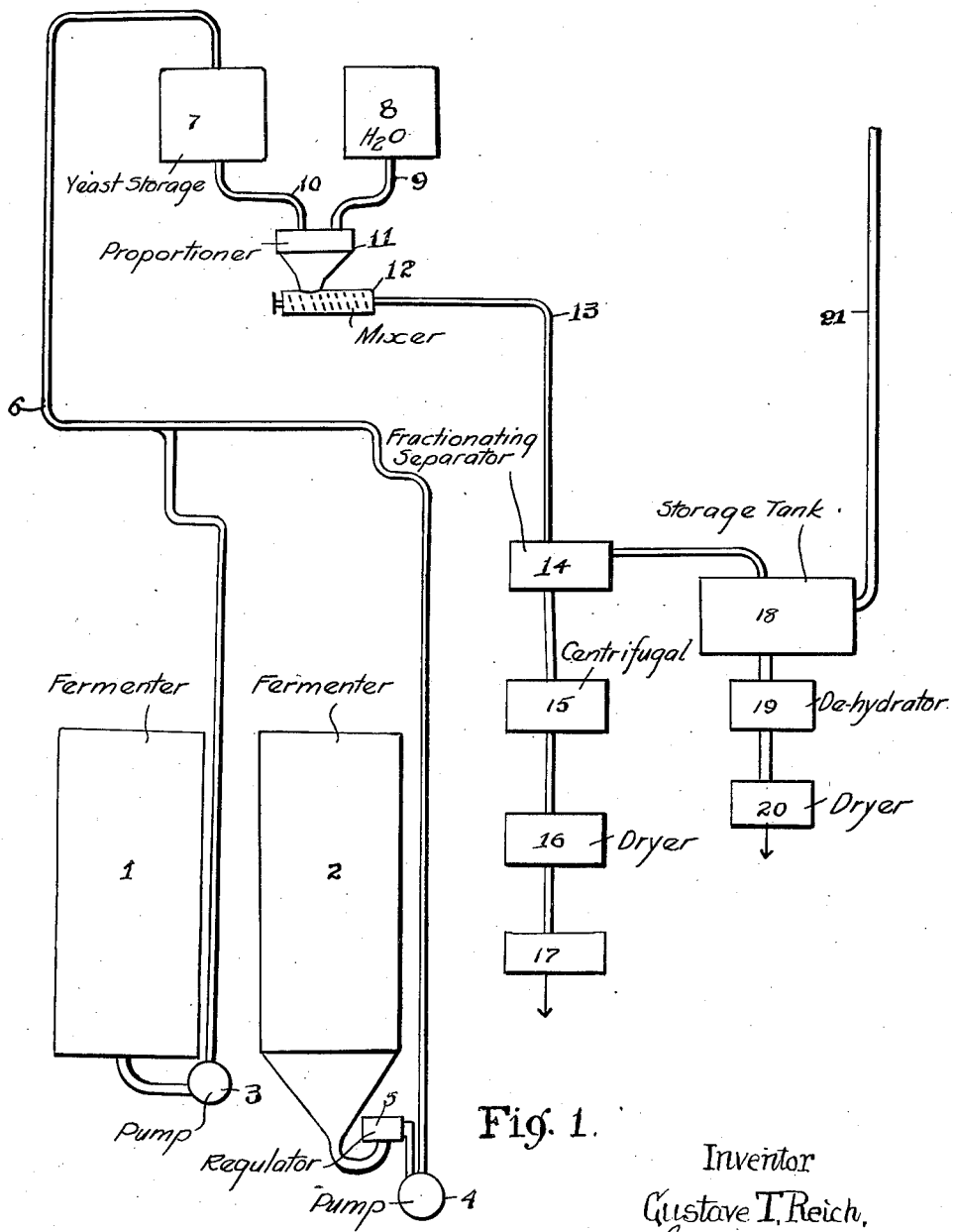

GUSTAVE T. REICH, OF DREXEL HILL, PENNSYLVANIA

PURIFYING YEAST

Application filed March 8, 1929. Serial No. 345,277.

The present art relates to the refining of yeast obtained from sugar refinery products or other saccharine materials, which when fermented yield alcohol either as a main or as a by-product, so that we may produce yeast either in a pure state for human food purposes, or without special treatment for animal feeds. The yeast which remains in these saccharine materials after fermentation is healthy living yeast of high grade, but was considered valueless as it was so mixed with gums, sand, fibre, cellulose or other adulterant material; and it has been discarded hitherto; even the amount of alcohol obtained was considered not to warrant any treatment of this yeast. The food yeast recovered and refined by my process is very light in color, almost tasteless, and requires no filler, and is very cheaply and readily prepared for animal feed. By my process also the alcohol is recovered, without destroying the latter, and this is usually of sufficient value to repay the entire cost of my process.

The expense of my process, although it produces yeast of the best grade is but a small percentage of the cost of producing it as a main product from cereals or even from molasses. Other processes are very elaborate, use very dilute solutions, and in them the yeast has to be especially propagated as distinguished from my process where yeast that already had been propagated and used for fermentative purposes is itself processed after the process that it was original propagated for had been completed.

In processes for producing yeast as a main product, the alcohol produced as a by-product is obtained in a very dilute state, and usually they apply "clarification" methods, and fillers or drying agents are contained in the yeast obtained, lowering thereby the protein contents of a bulk of the commercial product, rendering the devising of a less expensive method highly desirable.

This yeast from fermented saccharine material has been usually wasted, nevertheless it is of very fine quality, as it requires the use of fillers or various drying agents. The cost of refining the yeast by such methods increases the cost of processing, lowers the protein content, and increases the bulk, thus increasing the expense of shipping and packing.

Merely as an example, I shall refer to the fermented saccharine material of sugar refinery products that had been fermented to produce alcohol in which the yeast is contained. I shall briefly describe the character of these products, using as an example the material I shall probably use most of in the practical carrying out of my invention, viz. black strap molasses, which is a sugar refinery product from which, as far as practicable, all crystallizable sugar has been removed. This molasses contains a considerable amount of colloidal matter, sediment gums, plant tissues, etc. and inorganic salts such as those of potassium and sodium also calcium sulphate, the latter may be formed by the addition of sulphuric acid to the molasses. Sulphuric acid is often added to the molasses to retard the increase of organic acids during fermentation and to invert the sucrose. The molasses is usually diluted when the sulphuric acid is added. The various impurities mentioned above are not regarded, when the purpose is merely to produce alcohol, for their presence does not decrease the yield of this material; even in some instances they are desirable. In fact, a molasses containing large quantities of them is almost always used when the purpose is merely the production of alcohol from it after the crystallizable sugar has been removed. The high viscosity of these materials renders the filtration of them very difficult. Whether this molasses is sterilized or not varies according to the practice at different distilleries. Where the molasses has been sterilized before being fermented, part of the impurities will settle out at that time, but in all cases the great proportion of these impurities will settle out during the process of fermentation, partly through being less soluble in the alcohol produced, partly because they are decomposed during the fermentation and partly because the precipitation of them is favored by the lower sepcific gravity of the alcoholic liquid. When the fermentation is complete we have a dilute alcohol solution and a precipitate in the fermenters. This precipitate contains the yeast that was the means by which the alcoholic fermentation was produced, but it also contains the various foreign substances that have settled with it during the fermentation. It has a very slimy consistency, and its direct dehydration is very difficult, and, so far as I am aware, has not been practiced successfully on a commercial scale.

This yeast with its sedimental impurities, up to the present time, has been run directly into the sewer, or first de-alcoholized in the still, and then either burned or flushed into the sewer. The removal without de-alcoholizing is practical, when the loss of alcohol is of less commercial importance than the loss arising from clogging up the still with the contaminated yeast.

Bearing in mind that, when fermentation is completed, these fermenters contain an alcoholic liquid above a body of yeast that is contaminated with the various gums, &c. and salts. I may remove the yeast in various ways, three of which I will now set forth:— The choice between these methods depends upon factory conditions.

1st. I may draw off the clear liquor from the fermenter and then wash out the settled yeast at its bottom, as is customary in distilleries at present.

2nd. When the fermentation is completed, I may draw off the liquid and remove the yeast, preferably simultaneously, from the bottom of the fermenters. In order not to lose liquid containing alcohol, the bottom of the fermenter is shaped for the easy concentration of yeast and is connected to a density regulator whereby yeast of a determined density alone is removed, thus enabling the yeast purification plant to operate with a constant concentration and quick removal of yeast, thereby preventing its decomposition.

3rd. The clear liquid may be removed gradually, the yeast may be removed either at the end of the fermentation or before, by means of a thickener, like the Dorr thickener or a similar appliance which would deliver the thickened yeast at the bottom of the fermenters, whence it can be removed by suitable means.

When I have removed this yeast by any of the above enumerated or suitable means from the fermenters, it cannot be marketed. It decomposes. It has a very low protein content and unattractive color when dried. From a manufacturing standpoint, it is not profitable. While it can be centrifuged immediately and the alcohol and yeast recovered, the cost would be too high.

Fig. 1 is a diagram illustrating successive steps in an example of my process, diagrammatically only, the various units being relatively connected as shown.

In Fig. 1 are illustrated the fermenters 1 and 2, from which mains may pass through a pump 3 from 1, and through a pump 4, and regulator 5, from 2. The main 6 leads precipitated raw yeast to the yeast storage tank 7. 8 is a water tank, 9 and 10 conductors to the proportioner 11, which communicates with the mixer 12. The mixer has leads, 13, to the fractionating separator 14, whence the sediment may be removed and passes to the centrifugal 15, and to the dryer 16, from which is obtained the low protein yeast. The overflow consisting of liquid suspended yeast from the upper part of the fractionating separator 14, passes into the storage tank 18, where the higher protein yeast is treated, and washed if necessary, and the wash water may be carried off to the molasses mixing tanks or to the water tank 8, and the yeast suspended in the remaining liquid is de-hydrated, and the de-hydrated yeast dried to obtain the high protein yeast. This diagram however, is wholly illustrative.

The yeast removed from the fermenters may be treated successfully by applying to it the treatment I shall describe below. The yeast plant being microscopic in size and very slimy when removed from the fermenters has to be made amenable for easy treatment, these microscopic plants should be coagulated, and the impurities in the yeast separated out. The primary step in this treatment is to dilute the yeast coming from the fermenters with either fresh water, or preferably with waste water that had been used in a later stage of the treatment of the yeast.

The dilution varies with the nature of the molasses used in the fermentation, the concentration of the liquid containing the yeast, the alcohol content of the yeast, lime salts, gums, etc. on the percentage of unfermented sugar present in the clear liquid in the fermenters and the temperature. Each factor influences the ease of purification or refining of the yeast, some increase its viscosity and therefore decrease the rate of settling, others, like temperature, increase or decrease it.

According to the success of the fermentation and its molasses content, the settled yeast therefrom obtained by use of these three methods will average from 6–10% or more of alcohol content. In 1000 gallons of the separated yeast, there will be 60–100 gallons of absolute alcohol. After a previous determination of the temperature and concentration that gives not only the quickest settling and the greatest coagulation of the yeast plants, but also the most ease of separation of the other impurities, the unpurified yeast may be mixed with water, for example, in the ratio of 1:4. It is very important to know the proper ratio, as the yeast particles coagulate differently, at various concentrations and temperatures, and the further treatment depends much on adopting the proper ratio. If the 1:4 mixture is used, at a temperature of approximately 40° C., large coagulated yeast is obtained from the microscopic yeast, permitting easy washing and easy fractional separation, if necessary. In my treatment of the unpurified yeast, it will very frequently be found that, in the diluted state, after settling various distinct layers are formed. For simplicity, I shall refer to a formation of three layers only. The lower layer usually contains sand and other refuse and insoluble calcium salts, hence is very deficient in nitrogen and also therefore very deficient in protein content in the yeast and other salts. This layer when dehydrated and dried, has a protein content usually of less than 20%, though this varies with the conditions set forth above. The middle layer consists mainly of yeast in suspension in the liquid and its protein content is sometimes 48-52%. The top layer which frequently is discolored, settles very slowly, but is quite high in protein. The quantities of these layers may be summarized as follows:—lower layer 5-20%, middle layer 80-92%, top layer 3-10%. A knowledge of these layers is very important because not only do they influence the purity and color of the yeast but also this knowledge permits devising a better means for regulating their separation, thereby preserving a healthier yeast and decreasing the cost of the investment and other miscellaneous expenses.

Letting settle the unpurified yeast diluted, for instance, to 1:4 at a temperature of 40° C. will form the layers above described. The first layer will separate out within 5-10 minutes. The second layer will separate in less than ½ hour, and the last layer in 4-24 hours or even more. Knowing the rate of settling, I may pass the diluted yeast heated to say 40° C. through a settling tank, allowing time for the lower layer to settle out therein. I can then draw off the upper liquid (which contains the material for the two upper layers above mentioned) either continuously or intermittently, which I can treat as described below. I may then either wash the lower layer and return the overflow from this washing into the fermenter as a make up water for the dilution of molasses, or dehydrate and dry this lower layer without washing it. This liquid will have an alcoholic content of 1.2-2%, dependent on the saccharine material. The settled and if desired washed yeast of low protein content can be dried by any suitable means.

The liquid drawn off as above may either be treated without waiting for the separation out of the third or top layer, or it may be allowed to stand until this layer settles out, when the yeast is recovered by de-hydrating and drying, or any other suitable means.

The process can be varied greatly in detail. As set forth above, the particular processes described are merely illustrative, and are not to be taken as limitations on my invention, which is to be construed as broadly as the terms of the claims permit.

I claim—

1. The art of refining yeast contained in fermented saccharine materials comprising removing the yeast from the fermenters and purifying the yeast by dilution and subsequent gravity fractional separation.

2. The art of refining yeast contained in fermented saccharine materials, which comprises permitting the yeast to settle removing it by mechanical means, diluting it and then purifying the yeast by fractional gravity separation.

3. The process as defined in claim 2, in combination with the following step namely, extending the time of such gravity separation until, in this separation, is produced products with various protein content.

4. The art of refining yeast contained in fermented saccharine material by gravitationally fractionating this material and separately collecting and drying the fractions.

5. The art of refining yeast contained in fermented saccharine materials, comprising the step of diluting and heating the slimy yeast until it is converted into a loose coagulated yeast.

6. The art of refining yeast as contained in fermented saccharine materials, which comprises removing the yeast from the fermenters by mechanical means and then diluting it and then heating the same until the yeast removed is converted into a loose flocculent yeast, and gravitationally fractionally separating the yeast.

7. The art of purifying yeast contained in fermented saccharine materials, comprising the removal continuously from the fermenter and then diluting, heating, coagulating and gravitationally fractionating this yeast.

8. The art of purifying yeast contained in fermented saccharine materials, comprising removing the yeast from the fermenters and diluting, heating, coagulating and gravitationally fractionating it.

9. The art of refining yeast that had been contaminated by its use in producing the fermentation of saccharine materials, comprising diluting this contaminated yeast, separating the same by sedimentation into an upper portion containing yeast of higher protein value and a lower portion containing yeast of a lower protein value and also the impurities collected in the contaminated yeast during said fermentation, and separately collecting and de-hydrating said portions.

10. The art of refining yeast contained in the sediment produced during the alcoholic fermentation of sugar products, comprising diluting and heating this sediment, until the yeast therein becomes coagulated and flocculent, and then separating the yeast of higher protein value from that of less protein value by sedimentation and drawing off the yeast of higher protein value.

11. In a process of separating yeast of higher protein value from yeast of lower protein value when both are contained in a slimy sediment that had been produced during a fermentation of a saccharine material, the step of diluting and heating said sediment until the slime has been removed from said yeast, and gravitationally separating yeast of higher protein value from that of lower protein value and suspending the former in a layer positioned above the latter.

12. In the process of separating yeast of higher protein value from yeast of lower protein value where both are contained in a residue that had been formed in a fermentation of saccharine material, comprising diluting said residue and forming suspension by gravity of the yeast of higher protein value above the yeast of lower protein content; the step of collecting these parts separately and de-hydrating them separately.

13. The art of separating out from the sediment deposited during the alcoholic fermentation of sugar products of the living yeast of high protein value contained in this sediment, comprising diluting this sediment and heating it to about 40° C. while in a mobile state, allowing the yeast to settle whereby the yeast of higher protein value will form a layer above the remainder of the sediment, and collecting and de-hydrating the said layer.

14. The art as defined in claim 13, wherein the heating of the sediment is continued until the yeast of higher protein value is freed from slimy material.

15. The art of separating out from the slimy sediment precipitated during the process of fermenting saccharine material, of the yeast of high protein quality, consisting in diluting and mixing this sediment with water and heating it until the slime adhering to the yeast is dissolved therefrom and then settling by gravitation the suspension and allowing the yeast of less protein value to settle out and the yeast of high protein quality to separate out above the top of the material containing the yeast of less protein value and removing those layers separately.

16. The art of refining yeast contained in fermented saccharine material which consists in dilution and fractionate sedimentation of this material and collecting the various fractions separately and drying separately.

17. The art of refining slimy yeast contained in the sediment formed during fermentation, of saccharine materials comprising removing the yeast from the fermenters, diluting and heating the sediment containing the slimy yeast until it is converted into a loose coagulated yeast and by fractional sedimentation separating the different grades of yeast.

18. A composition of matter comprising coagulated living yeast with its structure undisrupted, said composition being void of starchy materials.

19. The art of purifying yeast contained in fermented saccharine materials, comprising removing the yeast from the fermenters and heating and diluting it, thereby coagulating it and then fractionally settling it.

20. The art of refining yeast that is contained in sediment deposited during the alcoholic fermentation of saccharine materials, which comprises separating and diluting the sediment, heating the same and allowing the sediment thus diluted to settle until a suspension containing the living clear yeast floats above a suspension containing the yeast of less value and the impurities, separating these suspensions and dehydrating the solid contents of each suspension.

21. The art defined in claim 13 wherein the settlement of the heated and diluted sediment is continued until a suspension of discolored yeast of high protein value separates out of and above the suspension containing the clear living yeast, and then separating the three suspensions and dehydrating the same.

22. The art of treating yeast that had become contaminated in the production of a fermentation by it in a saccharine solution, which comprises heating and diluting the said contaminated yeast, the heating and dilution being mutually regulated so as to produce a maximum of rapidity of coagulation of the yeast, continuing the heating until the yeast becomes flocculent, and separating the yeast of different qualities by sedimentation.

23. The art of treating yeast that had become contaminated in the production of a fermentation by it in a saccharine solution, said art comprising diluting said contaminated yeast to a proportion of 1 to 4, at a temperature of approximately 40° C. until the yeast becomes flocculent and coagulated and then separating the different grades of yeast by sedimentation.

24. The art of treating yeast that had become contaminated in the production of a fermentation by it of a saccharine material, which comprises removing the yeast, diluting the yeast until sufficient dilution is produced to allow the inorganic impurities when the yeast is heated to settle out freely and then heating the yeast so diluted until the separation of these inorganic materials from the yeast of high protein value is effected.

25. The art of treating yeast that had been contaminated with calcium salts in the production of a fermentation of a saccharine material, the steps of diluting the said impure yeast until the dilution is sufficient to allow the calcium salts to settle out by gravity when heated then heating the diluted yeast and then gravitationally fractionating the said yeast until it forms layers the lowest of which contains said calcium salts.

GUSTAVE T. REICH.